United States Patent [19]

Hamilton

[11] Patent Number: 4,605,378
[45] Date of Patent: Aug. 12, 1986

[54] BREAKDOWN BOAT PADDLE WITH VARIABLE CONFIGURATION

[76] Inventor: Don A. Hamilton, P.O. Box 1727, Easley, S.C. 29641

[21] Appl. No.: 684,374

[22] Filed: Dec. 20, 1984

[51] Int. Cl.$^4$ ............................................. B63H 16/04
[52] U.S. Cl. ................................. 440/102; 416/70 R; 416/72; 403/84; 403/103
[58] Field of Search .................. 440/101, 102, 97, 17, 440/19; 416/69, 70 R, 72, 74; 403/84, 103, 86, 83, 111, 109; 248/131, 415, 418

[56] References Cited

U.S. PATENT DOCUMENTS

| 526,333 | 9/1894 | Very | 403/84 |
|---|---|---|---|
| 1,817,414 | 8/1931 | Korth | 416/70 X |
| 3,970,032 | 7/1976 | Phillips | 440/102 |
| 3,975,050 | 8/1976 | McKee | 248/418 X |
| 4,385,849 | 5/1983 | Crain | 403/109 |

FOREIGN PATENT DOCUMENTS 2424016 11/1975 Fed. Rep. of Germany ...... 440/101

*Primary Examiner*—Sherman D. Basinger
*Assistant Examiner*—Paul E. Salmon
*Attorney, Agent, or Firm*—Cort Flint

[57] ABSTRACT

A double-bladed kayak paddle (A, B) is disclosed which includes first and second blade sections (10, 12) having a paddle blade (14, 18) carried on one end thereof, and jointed ends (16, 20) carried on opposing ends thereof. The jointed ends are fitted together to form a joint (C) which effectively prevents torque forces from being placed on a latch mechanism (D). The latch mechanism includes a latch button (24) carried within a hollow sleeve (22) which interfits within hollow portions of the first and second blade sections (10, 12). Latch openings (32, 34 and 60, 62) are circumferentially spaced around the first section (10) to provide a number of operational positions for different operational blade configurations. Various right and left hand control configurations are provided for the paddle, as well as feathered and non-feathered configurations. Angular projections (36, 38) formed in the jointed ends (16, 20) of the first and second sections intermesh with each other to positively prevent rotation between the first and second sections and effectively prevent any torque forces from being imparted through the latch mechanism (D). The angular projections are spaced at 90 degree increments to correspond to the operational locking positions of the latch openings (32, 34 and 60, 62). In this manner, torque stresses are effectively removed from the latch mechanism regardless of the position in which the first and second sections are interlocked.

20 Claims, 10 Drawing Figures

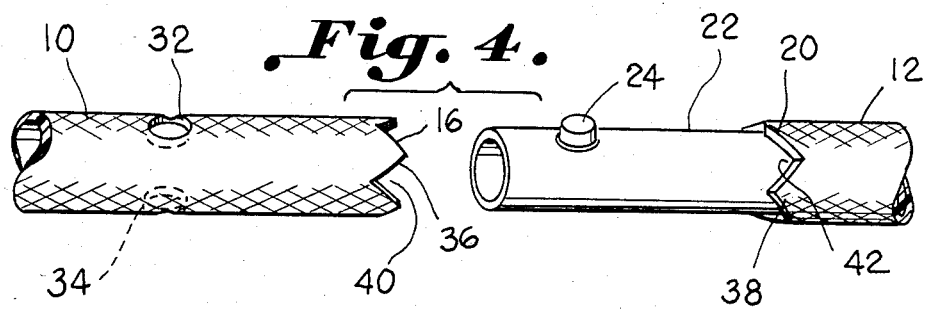
Fig. 4.
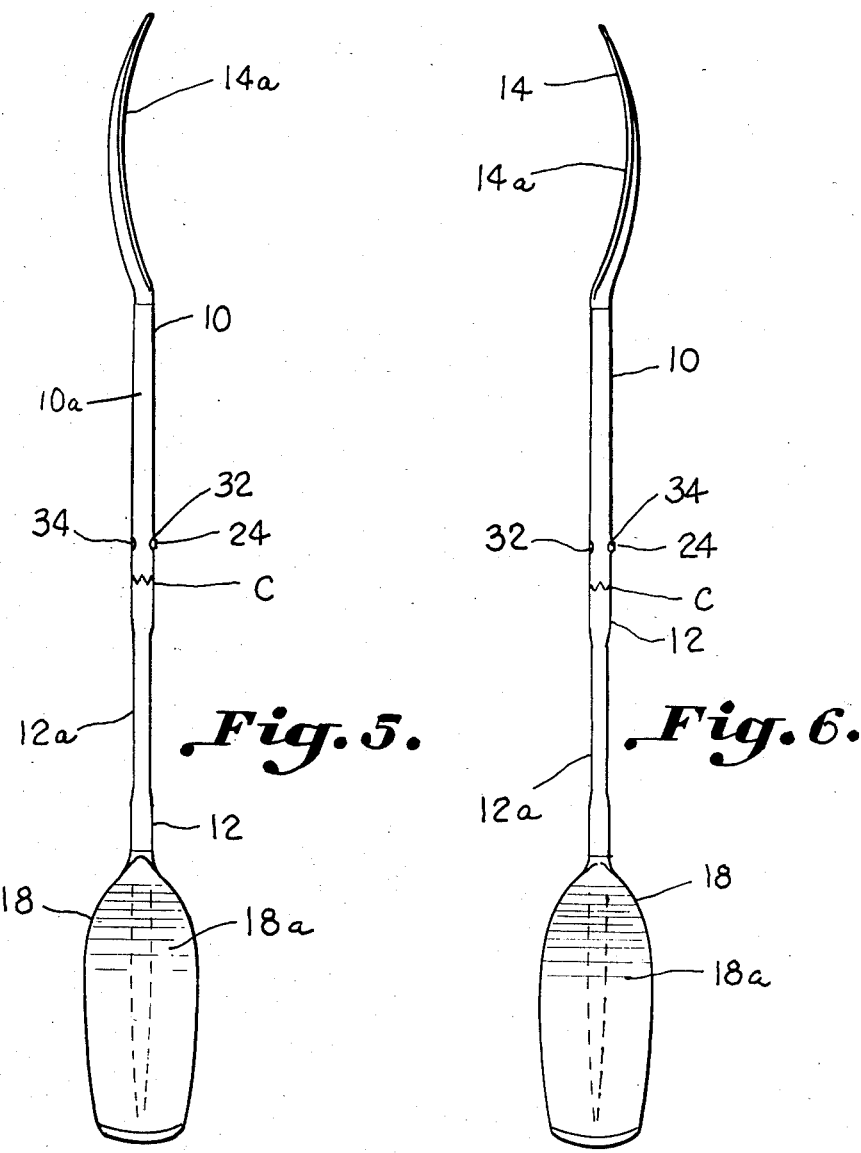
Fig. 5.
Fig. 6.

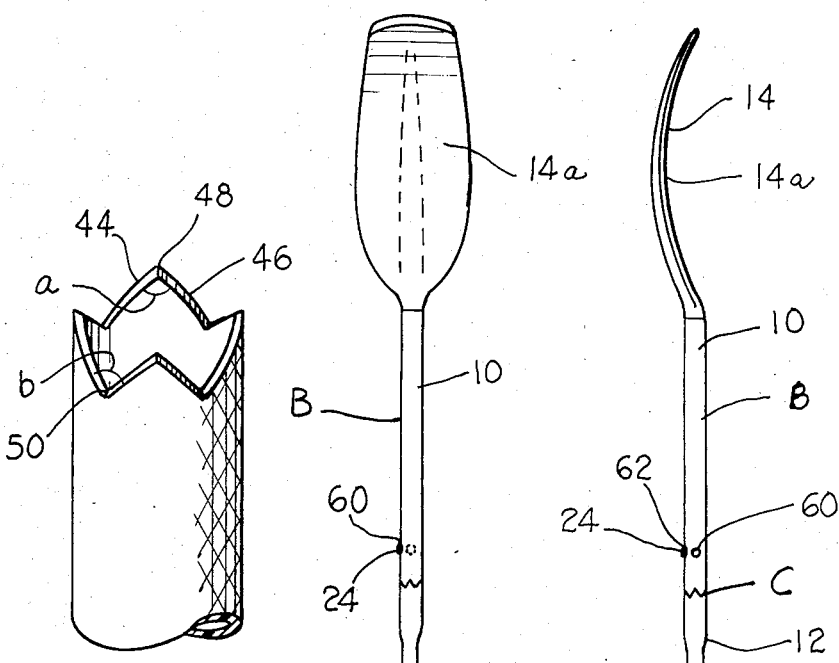

BREAKDOWN BOAT PADDLE WITH VARIABLE CONFIGURATION

The invention relates to a breakdown double-bladed kayak paddle which may be taken apart for storage. The paddle may be assembled for paddling a kayak or like boat and the blades may be set in a number of operational positions to provide the orientation of the blades relative to each other as desired by the boater.

With the increase in popularity of kayaking, there has been an increasing need to provide paddles for kayaking which have the versatility of being broken down for storage and transportation, yet are sturdy enough in construction to withstand the rigors encountered during kayaking. The integrity of the paddle must be such that it can withstand the torrid and vigorous conditions encountered in whitewater kayaking and other water conditions where the water is swift and strong. Since the kayak is guided by the paddle strokes in maneuvering a kayak through sharp turns and past obstacles encountered in whitewater and other swift water conditions, the provision of a paddle which can be broken down into two pieces yet have sufficient structural integrity when joined as one piece is a problem to which considerable attention need be given.

Furthermore, with the advent of ocean-going kayaking, it is necessary that a spare paddle be stored in the kayak. In the event that a paddle is broken or lost, or otherwise rendered inoperable, the spare paddle is utilized. In this situation, it is desirable that the paddle which is stored can be used either in a right hand or a left hand control configuration. Due to the development of kayaking, and the techniques involved in handling a kayak, the persons who are skilled in paddling a kayak normally have a preference for the type of paddle control that is used to paddle the kayak.

In a paddle which is controlled by the right hand, the wrist of the right hand is utilized to rotate the paddle 90 degrees on alternate strokes so that the face of the paddle blade properly enters the water. The shaft of the paddle is held loosely in the left hand while rotated by the wrist of the right hand on the left-hand stroke. In a left hand control paddle, the opposite is ture. The left hand grips the paddle, and the wrist of the left hand rotates the paddle generally 90 degrees which is held loosely in the right hand. In some applications, it is desirable to use a paddle which is made in either a right hand or a left hand control in both a feathered and nonfeathered configuration. A generally universal position is provided by a kayak paddle having a nonfeathered blade configuration. Thus, if a paddle that has been designed for either left or right hand control may be set to a nonfeathered position, the paddle can normally be used by anyone.

Adjustable and breakdown boat paddles have been heretofore known. In British Pat. No. 1,312,320 an oar is disclosed which can be taken apart. The sections of the oar are scarfed so that they fit together and form a tight joint. A threaded nut is tightened down over a threaded section on the other part to make a tight joint. The disclosure relates strictly to the joint of an oar and not to the double bladed paddle having multiple operational positions wherein the blades are oriented at different angles with respect to each other, nor to the elimination of torque stresses on a joint connection for fitting blade sections together in multiple positions.

U.S. Pat. No. 3,970,032 discloses a boat paddle whose blade can be set at different angles for varying the pitch. A quick release coupling is provided which is somewhat different in construction than that proposed in the instant invention.

Accordingly, an important object of the present invention is to provide a double-bladed boat paddle having a number of operational blade positions which can be broken down into two parts for transportation and storage, yet has a construction which is of sufficient integrity to withstand the rigors encountered in whitewater and other rough water paddling conditions.

Still another object of the present invention is to provide a breakdown boat paddle having a joint connection for providing a plurality of operational blade positions in which torque stresses are effectively relieved from the paddle lock of the joint connection.

Still another important object of the present invention is to provide an interlocking joint connection for a double-bladed breakdown boat paddle which has high integrity and reduces the torque stresses encountered in the jiont section to provide a highly versatile paddle which can be used in a number of paddle blade configurations.

SUMMARY OF THE INVENTION

The above objectives are accomplished according to the present invention by providing a double-bladed boat paddle having first and second sections which may be taken apart. Each section includes a paddle blade at one end and a jointed end at the remote end thereof. A tubular sleeve is carried by a first section which is received in a hollow portion of a second section so that a double layered construction is provided in the joint area. A depressable latch button is carried within the sleeve for interlocking in the first and second sections when joined together. A number of circumferentially spaced latch openings are formed in the second section through which the latch button protrudes to provide a latch assembly which locks the first and second sections together in a number of rotatable positions wherein the paddle blades are set at a desired angle relative to each other. Each of the jointed ends of the first and second section includes a number of circumferentially spaced angular projections which extend outwardly from the end of each section and intermesh with one another to positively lock the sections together against rotation. The angular projections correspond in their angular spacing to the circumferential spacing of the latch openings. The first and second sections may be separated from each other on the interfitted sleeve and rotated relative to each other and locked in a desired operational position with the angular projections engaged with each other. The interlocking angular projections of the jointed ends prevent any torque stress from being produced on the latch assembly as encountered during paddling.

DESCRIPTION OF THE DRAWINGS

The construction designed to carry out the invention will hereinafter be described, together with other features thereof.

The invention will be more readily understood from a reading of the following specification and by reference to the accompanying drawings forming a part thereof, wherein an example of the invention is shown and wherein:

FIG. 4 is a perspective view illustrating a pair of jointed ends of two separable sections for a breakdown boat paddle constructed according to the present invention;

FIG. 5 is an elevation illustrating a double bladed breakdown kayak paddle constructed according to the present invention in a right-hand feathered configuration;

FIG. 6 illustrates the paddle of FIG. 5 in a left-hand control feathered configuration;

FIG. 7 is a perspective view illustrating another embodiment of a pair of jointed ends for two sections of a double bladed breakdown kayak paddle constructed according to the present invention having a feathered and nonfeathered operational configuration;

FIG. 8 is an elevation illustrating a double bladed breakdown kayak paddle having jointed ends as shown in FIG. 7 in a nonfeathered configuration;

FIG. 9 is an elevation illustrating the paddle of FIG. 8 in a right-hand control feathered configuration; and FIG. 10 is a perspective view of a jointed end of a breakdown kayak paddle constructed according to the present invention.

DESCRIPTION OF A PREFERRED EMBODIMENT

Figure 1:
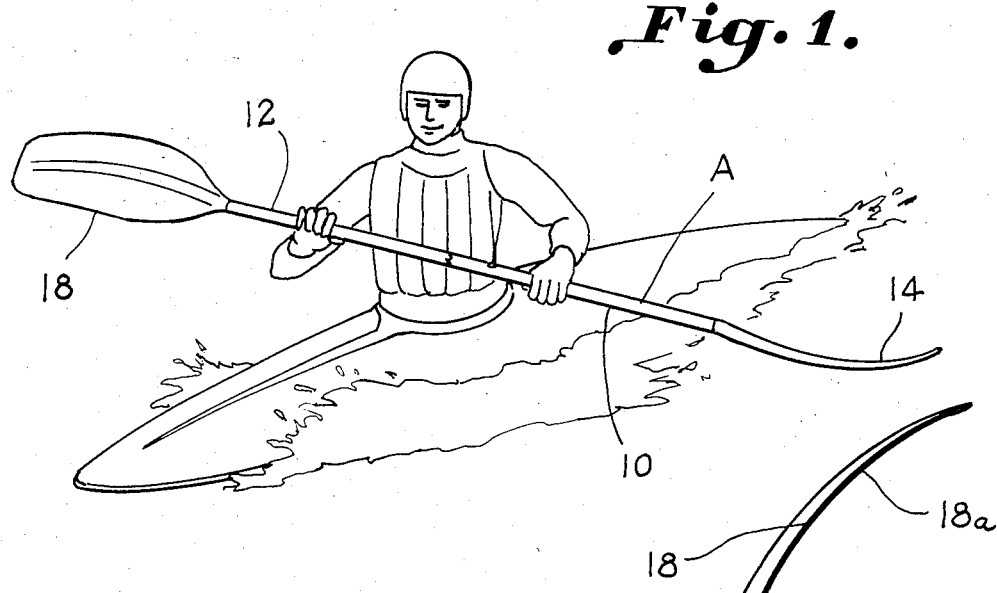
FIG. 1 is a perspective view illustrating a kayak and a breakdown kayak paddle constructed according to the present invention, with the paddle being in a right-hand control feathered configuration.

The invention relates to a breakdown boat paddle, and particularly to a paddle for a kayak which is of the type having a blade at each end of the paddle. Double bladed kayak paddles are normally manufactured in a variety of operational configurations. There are right-hand control and left-hand control paddles. The concave faces of the paddle blades are rotated 90 degrees from each other. In either case, the paddle is controlled either by the right or left hand, meaning that the paddle is twisted by the wrist of the right or left hand generally 90 degrees during the paddle strokes while the remaining hand holds the paddle loosely for rotation. The majority of kayak paddlers use a right handed control paddle. The majority of kayak paddlers also prefer to have a paddle which is feathered, that is, while the paddle stroke is being made with one blade, the edge of the other blade is generally facing forward and cuts through the air. In this configuration the paddle blades are rotated generally 90 degrees with respect to each other. A double bladed kayak blade can also be utilized quite often in a nonfeathered configuration in which case the faces of the paddle blades face in the same direction.

Referring now in more detail to the drawings, a breakdown kayak paddle is illustrated at A which includes a first elongated section 10 and a second elongated section 12. The section 10 has a paddle blade 14 carried at one end and has a jointed end 16 carried at the remote end thereof. The elongated section 12 includes a second paddle blade 18 and a second jointed end 20 at the remote end thereof. The paddle blades have concave paddle faces 14a, 18a.

Figure 2:
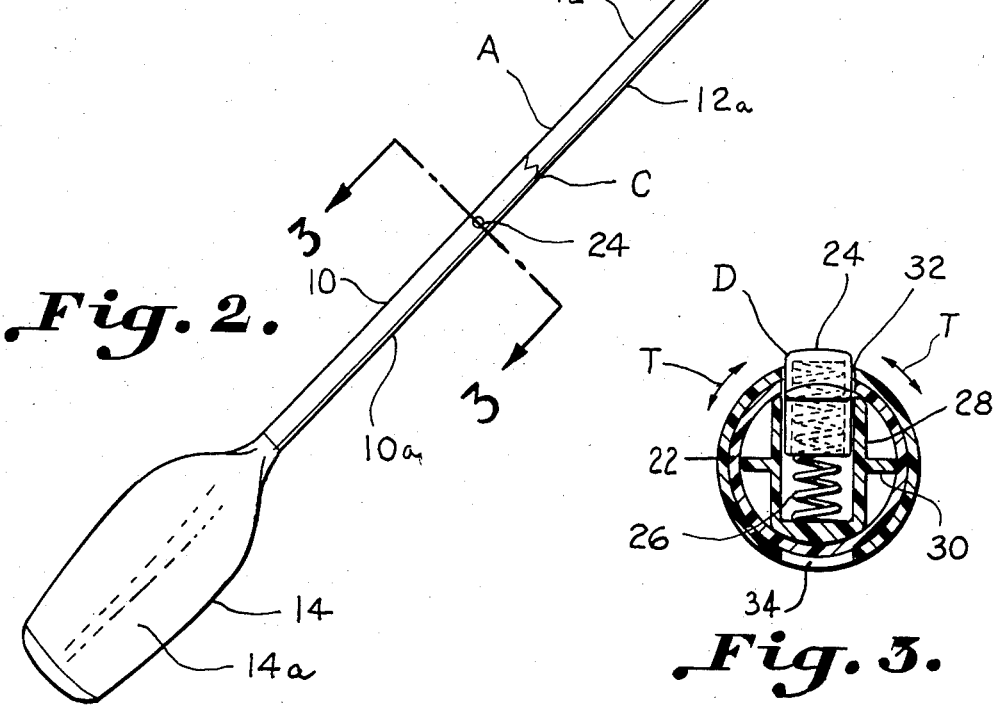
FIG. 2 is an elevation illustrating a double bladed breakdown paddle constructed according to the present invention in a right-hand control feathered configuration.

As can best be seen in FIGS. 2 and 4, the first and second sections 10 and 12 are of hollow tubular construction and include a handle portion 10a, 12a intermediate the ends thereof. There is a hollow sleeve 22 which is carried and affixed within a hollow portion of the second section 12. The sleeve 22 is receivable in a hollow portion of the first section 10. The sleeve is interfitted within the hollow portions of the first and second sections when they are joined together, as in FIGS. 5 and 6 to form a joint C.

Figure 3:
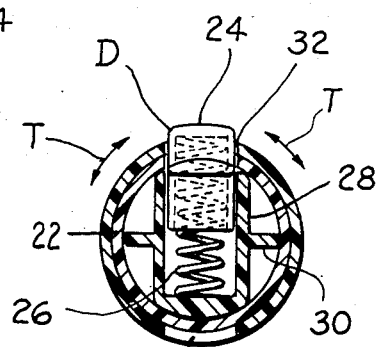
FIG. 3 is a section of view taken along line 3—3 of FIG. 2.

Referring now to FIG. 3, it can be seen that there is a latch assembly D which includes a lock means carried by the sleeve 22 of the second section which engages in a locking means in the first section to lock the first and second sections together in a desired selected paddle configuration. The lock means is illustrated in the form of a depressable latch button 24 which is received in the sleeve 22 and biased by a compression spring 26 to extend through an opening formed in the sleeve 22 for this purpose. The mechanism 28 of the latch button is contained within the hollow sleeve. A plastic housing of the mechanism 28 encloses the spring and the latch button 24 and includes spacer arms 34 for positioning and embracing the lock means within the hollow sleeve.

The locking means is provided by a number of circumferentially spaced latch openings 32 and 34 formed in the tubular member of the first section. As illustrated in FIG. 4, the latch openings 32 and 34 are spaced approximately 180 degrees apart. The latch opening 32 corresponds to a right-hand control feathered position as shown in FIG. 5 wherein blade face 14a is rotated 90 degrees to the right from face 18a. The latching opening 34 when interlocked with the latch button 24 corresponds to a left-hand feathered paddle configuration as can best be seen in FIG. 6 wherein blade face 14a is rotated 90 degrees to the left of face 18a. Means for resisting and eliminating the torque stresses on the latch button 24 when interlocked in either latch opening 32 or 34 is provided in the form of a number of angular projections 36 carried about the first jointed end 16 and a number of correspondingly shaped angular projections 38 carried about the second jointed end 20 to form a toothed edge on each end. The toothed edges include the angular projections or teeth 36 and 38, and a number of correspondingly shaped notches 40 and 42. The angular projections 38 fit in the notches 40, and the angular projections 36 fit in the notches 42 when the first and second jointed ends are interfitted together. The angular projections 36 and 38 are illustrated in FIG. 10 the form of a pair of converging generally straight edge surfaces 44 and 46 which intersect at an apex portion 48 and form a well-defined acute angle "a." The notches are formed by the edge surfaces 46 and 44 of adjacent angular projections which converge to a crevice portion 50 and intersect at an acute angle "b" which is equal to the acute angle "a." The convergent notch walls guide the angular projections easily and reliably while sleeve 22 slides into section 10 until the apex portion of the angular projection is fitted in the crevice portion of each notch providing a tight fit. When latch button 24 is in a latch opening, the abutting edge surfaces of the meshing angular projections interlock with each other positively and prevent any rotation between the first and second sections of the paddle. The torque stresses produced by twisting forces during paddling with the instant invention are effectively removed from the latch button 24 and the latch openings 32 and 34 of the latch mechanism D. This prevents failure of the latch mechanism and retention of the paddle blades in their locked operational configuration. If the torque stresses were transmitted through the latch mechanism, failure would likely occur and it would be impossible to retain the blade and the paddle in a operational configuration for paddling.

Referring now to FIGS. 7-9, a breakdown paddle is illustrated having a joint as heretofore described, yet which allows the blades of a paddle B to be set in either a feathered right-hand control configuration or a nonfeathered configuration. In a similar method, a left-hand control paddle may be provided having a nonfeathered or feathered configuration. The joint C in FIG. 7 is illustrated as including a pair of latch openings 60 and 62 which are spaced approximately 90 degrees apart. In FIG. 9, the latch button 24 is inserted in opening 62 to provide a right-hand feathered configuration for the paddle blades. In this configuration, the face 14a is rotated 90 degrees counterclockwise with respect to face 18a. In the nonfeathered configuration of FIG. 8, the faces 14a and 18a of the paddle blades face the same direction as the first section 10 has been rotated 90 degrees with the latch button received in the latch opening 60. Since the angular projections 36 and 38 are provided in 90 degree increments as illustrated in FIGS. 7 through 10, the angular projections interlock with the latch button 24 received in either latch opening 60 or 62. When so interlocked, the torque forces are effectively removed from the latch button and latch openings. Accordingly, a paddle construction is provided having sufficient integrity to withstand the rigors of paddling in whitewater and other rough water conditions.

In a preferred embodiment, the paddle sections 10 and 18 are constructed from a fiberglass material wherein the sections are made tubular. Once having been taught the instant invention, it can be seen that a third latch opening could be utilized in combination with the latch opening 60 and 62 that is spaced 90 degrees circumferentially with respect to latch button 60 in the direction opposite of latch button 62. A breakdown paddle is provided which may be utilized in either a right-hand control, a left-hand control, or a nonfeathered configuration. However, it has been found that the majority of boat paddlers use a right hand control, and that the forming of three latch openings in the first section of the paddle considerably weakens the structure. Accordingly, in the preferred embodiment it is preferred that a paddle having the capability of only a right hand feathered control and a nonfeathered configuration as shown in FIGS. 8 and 9 are provided. In the right-hand control position, the paddle can be used by most boaters. In the nonfeathered configuration of FIG. 8, the paddle can be used by any boater although without the expedient of being a feathered paddle.

Thus, it can be seen that an advantageous construction and method may be had in accordance with the present invention for resisting torque forces on an interlocked joint of a double-bladed breakdown boat paddle. First and second elongated paddle blade sections include jointed ends locked together by a latch mechanism which includes a lock means provided on a first of the sections and a locking means provided on a second of the sections. The sections may be interlocked in a number of rotatable positions corresponding to different operational paddle blade configurations. According to the method, torque stresses are removed from the latch mechanism by providing a number of angular projections on the jointed ends of each blade section. The angular projections mesh with one another and positively lock the paddle blade sections against rotation. No twisting forces are transmitted through the latch mechanism. The angular projections are made to correspond in their incremental spacing with the different lock positions of the latch mechanism. The blade sections may be rotated and locked together in a selected one of the operational positions wherein the angular projections are intermeshed with one another in any of the operational positions.

The latching mechanism selects the desired operational configuration of the paddle while the torque-eliminating angular projections resist twisting forces in the paddle and isolate the latch mechanism from any torque stresses.

While a preferred embodiment of the invention has been described using specific terms, such description is for illustrative purposes only, and it is to be understood that changes and variations may be made without departing from the spirit or scope of the following claims.

What is claimed is:

1. A breakdown boat paddle for a kayak and the like comprising:

a first section having a paddle blade carried on one end and a jointed end formed on the opposing end with a handle portion in between;

a second elongated section having a paddle blade carried on one end and a jointed end formed on the other end with a handle portion in between;

a joint formed between the jointed ends of said first and second sections when fitted together to make a double-bladed boat paddle;

a sleeve carried by the jointed end of said second section receivable in the jointed end of said first section;

a lock means carried by said sleeve of said second section;

locking means carried by said first section for engaging with said lock means in a number of predetermined operational positions of operational paddle blade orientations in a manner that said paddle may be configured for righthand or lefthand control operation;

said lock means and locking means interlocking in such a manner that said first and second sections are fixed against axial and rotational movement in relation to one another;

torque resisting means formed on the jointed ends of said first and second sections which positively prevents rotation between said first and second sections and removes torque stresses from said lock means and locking means when interlocked with each other to prevent failure thereof.

2. The device of claim 1 wherein said lock means includes a latch button carried by said sleeve of said second elongated section, and said locking means includes a number of circumferentially spaced latch openings carried by said first elongated section at the junction of said first and second sections.

3. The device of claim 1 wherein said torque resisting means includes a number of circumferentially spaced angular projections formed around the free edges of said jointed ends of said first and second sections extending away from said jointed ends so that the angular projections of the jointed ends intermesh with one another at the joint of said first and second sections.

4. The device of claim 3 wherein said angular projections are spaced in 90 degree increments around the free edges of each said jointed end, said 90 degree increments corresponding to said predetermined operational positions of paddle blade configurations provided by lock and locking means.

5. The device of claim 3 wherein said angular projections include diverging edge surfaces which intersect at an acute angle forming a generally sharp apex portion, said edge surfaces being generally planar and abutting one another edgewise to positively lock said first and second sections against rotation relative to each other.

6. The device of claim 3 wherein said angular projections form a toothed edge at the jointed ends of said first and second sections defined by alternating teeth and notches, said teeth being formed by a pair of converging edge surfaces which converge to an apex at a well-defined acute angle, said notches being defined by converging edge surfaces of adjacent teeth which converge to a crevice portion and intersect at a well defined, acute angle corresponding to the acute angle of said apex portion, said crevice portions receiving said apex portions of opposing jointed ends to join the same in a tight fit.

7. A device of claim 6 wherein said lock means includes a push latch button received within said sleeve, and said locking means includes a number of latch openings formed in said first section through which said latch button may be received for interlocking said first and second sections, said toothed edges of said jointed ends being interfitted to effectively resist and remove twisting stresses upon said latch button when received in one of said latch openings in said interlocking position.

8. A breakdown kayak paddle having a pair of paddle blades which may be oriented in a number of operational paddle blade configurations, said breakdown paddle comprising:
a first elongated tubular section having a paddle blade on one end thereof and a first jointed end on the remote end thereon;
a second elongated tubular section having a paddle blade on one end and a second jointed end on a remote end thereof for fitting with said first jointed end of said first section;
a tubular sleeve carried within a hollow portion of said second elongated section having a free end which is receivable in a hollow portion of said first elongated section;
a lock means carried by said sleeve;
a locking means carried by said first section for locking said first and second sections in a number of predetermined rotatable positions with respect to each other so that said first and second paddle blades are oriented in a selected operational configuration with respect to each other;
said lock means and locking means interlocking together in such a manner that said first and second sections are fixed against axial and rotational movement in relation to one another;
angular projections carried by said first and second jointed ends which are circumferentially spaced in 90 degree increments around said fist and second jointed ends, said 90 degree increments corresponding to said predetermined operational positions of said paddle blade orientations; and
said angular projections of said first jointed end intermeshing with the angular projections of said second jointed end to positively prevent rotation between said first and second sections where locked together, and thereby relieve and prevent any stresses on said lock means and locking means when interlocked with each other due to twisting forces on said paddle.

9. The device of claim 8 wherein said angular projections are defined by a toothed edge having alternating teeth and notches which are spaced around the circumference of each said first and second jointed ends, said teeth being spaced in 90 degree increments corresponding to said predetermined operational positions of selected paddle blade orientations, and said teeth and notches of said first and second jointed ends intermeshing with one another when said lock means and locking means are locked in said predetermined operational positions.

10. The device of claim 8 wherein said angular projections are defined by generally straight edge surfaces which intersect at well-defined acute angles, said edge surfaces of adjacent intermeshing angular projections abutting one another generally edgewise to positively lock said first and second sections against rotation.

11. The device of claim 8 wherein said angular projections are spaced 90 degrees around the circumference of said first and second jointed ends so that said first and second sections may be rotated in 90 degree increments to set the paddle blades at 90 degree angles with respect to each other to provide said selected operational paddle configurations in correspondance with said lock and locking means.

12. The device of claim 8 wherein said angular projections of said first and second jointed ends intermesh with each other at the joint of said first and second sections, and said angular projections lie flush with one another and said first and second sections at said joint.

13. The device of claim 12 wherein each said first and second jointed ends includes four angular projections extending from said end and with a correspondingly shaped notch between each said angular projection in which opposing angular projections of an adjoining section are received.

14. The device of claim 8 wherein said locking means includes at least two locking positions which are circumferentially spaced around said second section at 90 degree increments.

15. The device of claim 8 wherein said joint of first and second sections includes a tubular double-wall construction.

16. The device of claim 8 including a first operational position in which a face of said first and second paddle blades are oriented in the same direction in a nonfeathered configuration, and a second operational position wherein said faces of said first and second paddle blades are rotated 90 degrees with respect to each other in a feathered configuration.

17. The device of claim 8 including a first operational position in which a face of a first paddle blade is rotated 90 degrees counterclockwise from a face of said second paddle blade to provide a right-hand, feathered, operational paddle configuration, and a second operational position wherein said face of said first paddle blade is rotated 90 degrees clockwise from said face of said second paddle blade to provide a left-hand, feathered, operational paddle configuration.

18. The device of claim 17 wherein said faces of said paddle blades are concave.

19. A method of resisting twisting forces on an interlocked joint of a breakdown boat paddle of the type which comprises first and second elongated sections with a paddle blade on one end of each section and a jointed end remote from the paddle blade on each section, said jointed ends being fitted together to form a double-bladed boat paddle, said method comprising:

providing a lock means on a first of said sections;

providing a locking means on a second elongated section for interlocking with said lock means having a number of operational locking positions corresponding to predetermined operational paddle blade orientations;

interlocking said lock means and locking means together in such a manner that said first and second sections are locked together against movement in axial and rotational directions;

relieving torque stresses on said interlocked lock means and locking means occurring from twisting forces on said paddle by providing a plurality of angular projections on said jointed ends which interfit with one another with abutting edge surfaces that positively prevent rotation of said first and second sections relative to each other; and spacing said angular projections around the edges of said jointed ends so that they fit together when said lock means and said locking means are interlocked in any one of said operational locking positions.

20. The method of claim 19 including providing four angular projections on the jointed end of each of said first and second sections which are spaced in 90 degree increments around the circumference of the said jointed end defining correspondingly shaped angular notches between each angular projection, and forming said angular projections and notches with generally straight edges so that the angular projections of opposing jointed ends are guided easily in said notches formed between the angular projections to interfit and positively lock said jointed ends together.

\* \* \* \* \*